(12) United States Patent
     Cheng

(10) Patent No.: US 11,896,155 B2
(45) Date of Patent: Feb. 13, 2024

(54) ARTICLE WITH REINFORCED NONSTICK FOOD PREPARATION SURFACE

(71) Applicant: Meyer Intellectual Properties Ltd., Kowloon (HK)

(72) Inventor: Stanley Kin Sui Cheng, Hillsborough, CA (US)

(73) Assignee: Meyer Intellectual Properties Ltd.

( * ) Notice: Subject to any disclaimer, the term of this patent is extended or adjusted under 35 U.S.C. 154(b) by 505 days.

(21) Appl. No.: 17/118,009

(22) Filed: Dec. 10, 2020

(65) Prior Publication Data

US 2021/0093121 A1   Apr. 1, 2021

Related U.S. Application Data

(62) Division of application No. 15/441,853, filed on Feb. 24, 2017, now abandoned.

(60) Provisional application No. 62/299,669, filed on Feb. 25, 2016.

(51) Int. Cl.
    *A47J 36/02*   (2006.01)
    *B05D 5/08*    (2006.01)
    *B21D 51/22*   (2006.01)

(52) U.S. Cl.
     CPC ............ *A47J 36/025* (2013.01); *B05D 5/08* (2013.01); *B21D 51/22* (2013.01)

(58) Field of Classification Search
     CPC ........................ A47J 36/025; A47J 36/02
     See application file for complete search history.

(56) References Cited

U.S. PATENT DOCUMENTS

| 4,613,070 A | 9/1986 | Rummelsburg |
| 5,345,667 A | 9/1994 | Coppier |
| 5,430,928 A | 7/1995 | Flammang |
| 5,506,062 A | 4/1996 | Flammang |
| 5,564,590 A | 10/1996 | Kim |
| 5,694,674 A | 12/1997 | Flammang |
| 6,061,892 A | 5/2000 | Kassi |
| 6,702,140 B1 | 3/2004 | Sollo |
| 6,782,599 B1 | 8/2004 | Sollo |
| 8,540,107 B2 | 9/2013 | Lee et al. |
| 2007/0051731 A1 | 3/2007 | Cheng |
| 2008/0142526 A1 | 6/2008 | Cheng et al. |
| 2009/0127268 A1 | 5/2009 | Cuillery et al. |
| 2011/0017603 A1 | 1/2011 | Cheng |
| 2012/0305568 A1 | 12/2012 | Lee et al. |

(Continued)

FOREIGN PATENT DOCUMENTS

| CA | 2276295 C | 8/2006 |
| CN | 103445666 A | 12/2013 |

(Continued)

OTHER PUBLICATIONS

International Search Report dated Jun. 11, 2017 in connection with PCT/US2017/019395.

(Continued)

*Primary Examiner* — James M Mellott
(74) *Attorney, Agent, or Firm* — Akerman LLP

(57) ABSTRACT

Cookware surfaces of metal, such as aluminum, may include a nonstick coating and embedded hard metal mesh. The mesh protects the nonstick coating between interior regions within the mesh from being cut or abraded by knives and other tools.

3 Claims, 5 Drawing Sheets

(56) References Cited

U.S. PATENT DOCUMENTS

| | | | |
|---|---|---|---|
| 2014/0004311 | A1 | 1/2014 | Alim |
| 2014/0061205 | A1 | 3/2014 | Chiu |
| 2015/0090725 | A1 | 4/2015 | Cheng |
| 2017/0245677 | A1 | 8/2017 | Cheng |

FOREIGN PATENT DOCUMENTS

| | | | | |
|---|---|---|---|---|
| CN | 203539072 U | 4/2014 | | |
| CN | 203539085 U | 4/2014 | | |
| CN | 203970067 U | 12/2014 | | |
| CN | 204091755 U | 1/2015 | | |
| CN | 104382481 A | 3/2015 | | |
| CN | 204218640 U | 3/2015 | | |
| CN | 104582543 A | 4/2015 | | |
| EP | 928588 B1 * | 5/2003 | ............ | A47J 27/002 |
| EP | 0970647 B1 | 5/2003 | | |
| GB | 2370975 B | 6/2004 | | |
| JP | S59-146619 A | 8/1984 | | |
| JP | H0591950 A | 4/1993 | | |
| JP | H06-296553 A | 10/1994 | | |
| JP | 2002-199984 A | 7/2002 | | |
| JP | 2002199984 A | 7/2002 | | |
| JP | 2015-521878 A | 8/2015 | | |
| KR | 100804387 B1 | 2/2008 | | |
| KR | 10-2013-0026049 A | 3/2013 | | |
| KR | 101324031 B1 | 11/2013 | | |
| TW | 245688 B | 4/1995 | | |
| WO | 2007123353 A1 | 11/2007 | | |
| WO | 2011069351 A1 | 6/2011 | | |
| WO | 2013035994 A2 | 3/2013 | | |
| WO | WO-2013142151 A1 * | 9/2013 | ............ | A47J 27/002 |

OTHER PUBLICATIONS

Written Opinion dated Jun. 11, 2017 in connection with PCT/US2017/019395.
Notification of Reasons for Refusal dated Jun. 23, 2020, issued in connection with corresponding Japanese Patent Application No. 2018-545143.
Notice of Office Action dated Sep. 20, 2019 in connection with corresponding Korean Patent Application No. 10-2018-7027884.
First Substantive Examination Report issued in connection with Saudi Arabian Patent Application No. 518392268.
Supplementary European Search Report dated Aug. 19, 2019 in connection with corresponding European Patent Application No. 17757319.3.
International Search Report dated May 14, 2013 in connection with PCT/US2013/030537.
Third-party Submission Under 37 CFR 1.290 in connection with U.S. Appl. No. 13/537,948 dated Mar. 21, 2014; 50 pages.
Written Opinion of the International Searching Authority dated May 14, 2013 in connection with PCT/US2013/030537.
McNichols "Most Popular McNichols Quality Hole Products" <http://www.mcnichols.com/>.
Office Action and Search Report issued in connection with corresponding Russian Patent Application No. 2018130774, dated Jun. 24, 2019.
Examination Report issued in connection with corresponding Australian Patent Application No. 2017222636, dated Nov. 26, 2018.
First Examination Report dated Aug. 4, 2020 in connection with European Patent Application No. 17757319.3.
Second Examination Report dated May 7, 2021 in connection with European Patent Application No. 17757319.3.
English Translation of the Preliminary Office Action Report dated Feb. 15, 2022, in connection with Brazilian Patent Application No. 11 2018 067425 7.
Notification of Second Office Action and Search Report dated Mar. 1, 2021 in connection with Chinese Patent Application No. 2017800255182.
Notification of First Office Action and Search Report dated May 7, 2020 in connection with Chinese Patent Application No. 2017800255182.
Notification of Reasons for Refusal dated Oct. 29, 2019, issued in connection with corresponding Japanese Patent Application No. 2018-545143.
Second Substantive Examination Report dated Jan. 27, 2021 in connection with Indonesian Patent Application No. P00201806770.
First Substantive Examination Report dated Aug. 25, 2020 in connection with Indonesian Patent Application No. P00201806770.

* cited by examiner

ARTICLE WITH REINFORCED NONSTICK FOOD PREPARATION SURFACE

CROSS-REFERENCE TO RELATED APPLICATIONS

This patent application is a divisional of U.S. patent application Ser. No. 15/441,853, filed Feb. 24, 2017, entitled "Article with Reinforced Nonstick Food Preparation Surface," which itself claims priority from U.S. Provisional Patent Application No. 62/299,669, filed on Feb. 25, 2016, the contents of both of which are hereby incorporated by reference in their entirety.

TECHNICAL FIELD

The present invention relates to cookware and surfaces thereof, such as food preparation surfaces and induction heating features of pots, pans, platens, griddles and grills.

BACKGROUND

Some foods tend to stick to cookware surfaces. This tendency is particularly common with heated cookware surfaces when preparing such foods. To combat this tendency, cookware articles may be outfitted with what is often referred to as "nonstick" or "easy release" cooking surfaces. These surfaces typically include coated metal surfaces including fluorocarbons, such as PTFE; vitreous enamel; silicones; and ceramics.

SUMMARY

In one aspect, a cookware article includes a base material layer, a mesh layer, and a nonstick coating layer. The base material layer may have at least a first base surface along a first side. At least a first mesh layer may be disposed on the first base surface. The first mesh layer may include a plurality of first network segments embedded in the first base surface and that extend outward therefrom to a planar outer first mesh surface. The first network segments may define a plurality of first interior regions between adjacent first network segments. The nonstick coating layer may be disposed on the first base surface, within the first interior regions between the adjacent first network segments, and extend outward therefrom to an outer nonstick coating surface adjacent to the outer first mesh surface. The outer first mesh surface may be disposed outward of the first base surface farther than the adjacent outer nonstick coating surface such that the nonstick coating surface is disposed below the outer first mesh surface.

The first base surface and layers thereon may employ a variety of configurations. For example, in various embodiments, each of the first and second portions of the first base surface are planar. In further embodiments, the outer nonstick coating surface may include a plurality of discrete surfaces interspersed between the first network segments. The first network segments may be interconnected and laterally surround the plurality of first interior regions. In one embodiment, the base material layer comprises aluminum and the first mesh layer comprises stainless steel first network segments. Adjacent first network segments may define one of parallelogram, hexagonal, or rhomboidal first interior regions. For example, adjacent first network segments may define hexagonal interior regions.

In various embodiments, the base material layer may include a second base surface along a second side, opposite the first side. The cookware article may further include a second mesh layer disposed on the second base surface. The second mesh layer may include a plurality of second network segments embedded in the second surface and extending outward therefrom to a planar outer second mesh surface and defining a plurality of second interior regions between adjacent second network segments.

In one embodiment, the second base surface within the second interior regions defined by the adjacent second network segments has an outer second base surface disposed outward beyond adjacent second base surfaces in which the second network segments are embedded. In this or another embodiment, the outer second mesh surface may be disposed outward at least as far as adjacent outer second base surfaces. Each of the first and second base surfaces may be planar. In further embodiments, the outer nonstick coating surface may include a plurality of discrete surfaces interspersed between the first network segments, and the outer second base surface may include a plurality of discrete surfaces interspersed between the second network segments. The first network segments may be interconnected and laterally surround the plurality of first interior regions, and the second network segments may be interconnected and laterally surround the plurality of second interior regions.

The layers may include various materials. In one example, at least one of the first network segments, the second network segments, or both include stainless steel. In a further example, the first network segments include stainless steel and the second network segments include magnetic stainless steel alloy. In some embodiments, the base material layer may include aluminum. The base material layer may also include copper or other suitable metal or alloy.

The network segments may include various shapes, sizes, and patterns. For example, in one embodiment, the adjacent first network segments define hexagonal first interior regions.

The features of the cookware article surface may be configured with various dimensions. For example, interior regions may have a surface dimension between about 0.8 mm and about 2 mm. In this or another embodiment, network segments have a width of between about 0.3 mm and about 0.5 mm. In any of the above or another embodiment, network segments may have a thickness between about 0.5 mm to about 1 mm normal to the cookware article surface. In any of the above or a further embodiment, the base material layer is between 3 mm and 4 mm thick.

Various cookware articles employing the inventive surface features may include a pot, pan, tray, platter, platen, grill, griddle surface, baking tray or pizza pan.

In another aspect, a method of making a surface of a cookware article may include providing a base material including a metal or metal alloy and coating at least one planar surface of the metal or alloy with an organic nonstick material. The method may further include compressing a mesh comprising a plurality of network segments including a metal or metal alloy onto the coated surface to embed the network segments into the base material. The network segments may define a plurality of interior regions between adjacent network segments. The network segments may also extend outward of the base material beyond the nonstick material.

In various embodiments, the method may further include compressing a mesh comprising a plurality of network segments including a metal or metal alloy onto another surface of the base material located on an opposite side thereof. The network segments may define a plurality of interior regions between adjacent network segments. The network segments may extend outward of the base material at least as far as outer surfaces of the base material layer within the interior regions defined between the network segments.

The above and other objects, effects, features, and advantages of the present invention will become more apparent from the following description of the embodiments thereof taken in conjunction with the accompanying drawings.

BRIEF DESCRIPTION OF THE DRAWINGS

Novel features of the present invention are set forth with particularity in the appended claims. However, the various embodiments of the present invention described herein, both as to organization and manner of operation, may be best understood by reference to the following description, taken in conjunction with the accompanying drawings in which:

FIG. 1A is a schematic cross-sectional elevation view of an upper portion of a cookware article surface according to various embodiments described herein, whereas

FIG. 2A is a schematic cross-sectional elevation view of an upper portion of a cookware article surface according to various embodiments described herein, whereas

DESCRIPTION

Figure 1A:
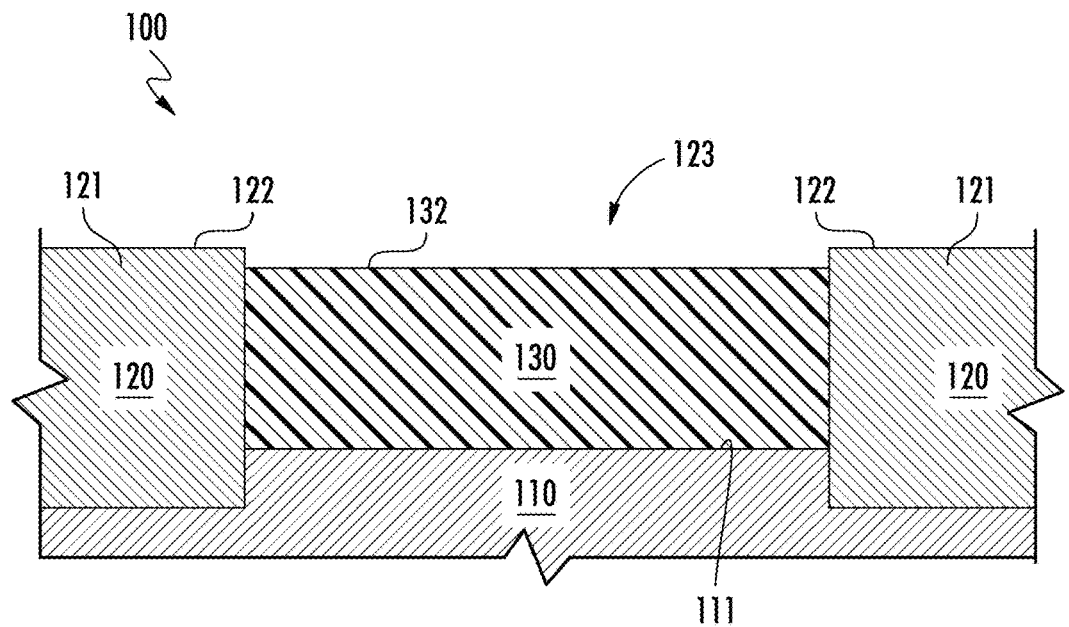

Nonstick or easy release cooking surfaces are typically deployed as coatings. The durability of these coatings may be enhanced through chemistry, particulate reinforcement, and layers. However, even when enhanced, nonstick or easy release coatings may still be easily scratched or cut by hard tools or other cookware, such as cookware utensils including sharp tools like knives and circular pizza cutters, or with similar sharp instruments. Thus, this lack of durability also limits cross-use of cookware articles that may damage a coating of either article.

According to various embodiments, the present disclosure describes reinforced nonstick cookware article surfaces, generally denominated article surface 100 in FIGS. 1A-4B, wherein like reference numerals refer to like components in the various views. The cookware article surface 100 may comprise one or more layers of materials. The cookware article surface 100 may be embodied in any cookware article, such as pots, pans, platens, griddles, grills, roasting pans, utensils, and the like. The surface 100 may be constructed to allow users to cut and slice food on the article surface 100, without damaging the nonstick finish. In some embodiments, for example, the surface 100 comprises a cut resistant nonstick construction for cookware articles such as pots, pans, platens, griddles, grills, roasting pans, and the like. While referred to herein as surface 100, it should be understood that the layered material of the surface 100 may form an expanse of a wall, through the thickness of the wall, of a cookware article or may be further layered onto another material to form an expanse of a wall of a cookware article.

Figure 1B:
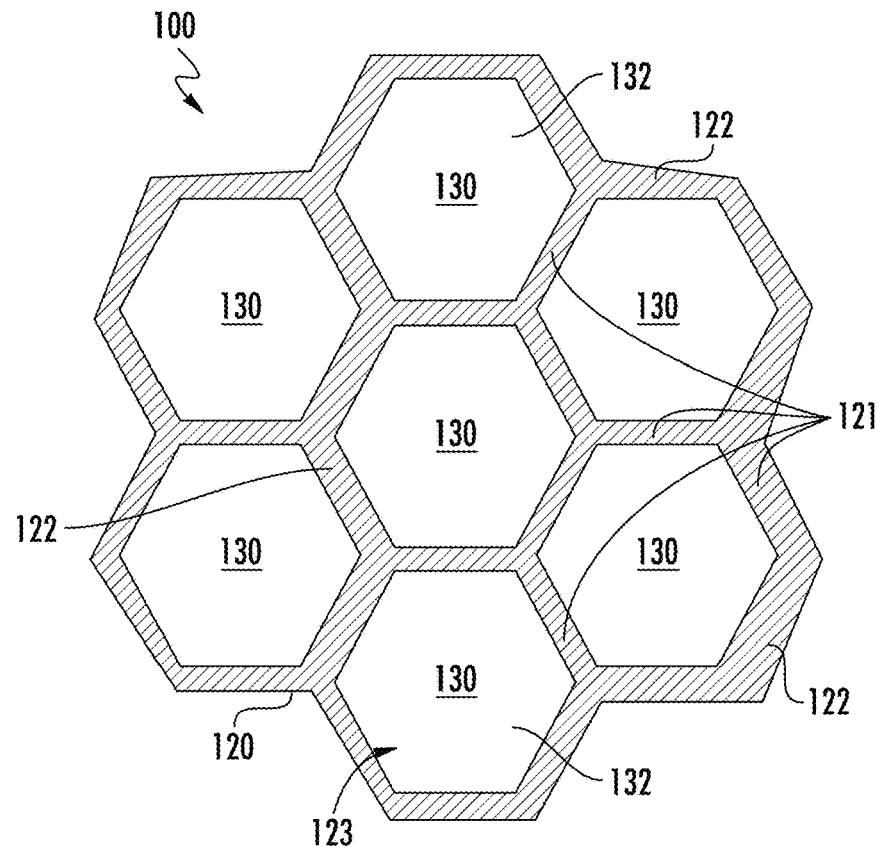
FIG. 1B is a top plan view thereof.

With reference to FIGS. 1A & 1B, the cookware article surface 100 may include a base material layer 110. The base material layer 110 will typically include a thermally conductive material such as a metal. The base material layer 110 may preferably be a malleable metal, such as a soft metal, e.g., aluminum, copper, or alloys thereof. In one embodiment, for example, the base material 110 is aluminum.

The cookware article surface 100 may also include a mesh layer 120 disposed over at least a portion of a surface 111 of the base material layer 110. The portion of the surface 111 onto with the mesh layer 120 is disposed will typically be planar. Thus, the mesh layer 120 may be disposed over a planar surface portion of the surface 111. The mesh layer 120 includes a plurality of network segments 121 arranged along the surface 111 of the base material layer 110 that extend outward therefrom to together define a generally planar outer mesh surface 122 above the base material surface 111. Adjacent network segments 121 along the mesh layer 120 may define a plurality interior regions 123. The interior regions 123 may have various shapes and sizes as described in more detail below. The interior regions 123 may be patterned to include consistent sizes, shapes, and alignments. The network segments 121 may be interconnected to laterally surround interior regions 123 or may be partially or entirely disconnected to partially laterally surround interior regions 123. The mesh layer 120 may embed within the surface 111 of the base material layer 110. For example, as shown, inwardly positioned portions of the network segments 121 that interface with the surface 111 may embed in the base material layer 110.

The cookware article surface 100 may also include a nonstick coating layer 130 that coats a portion of the surface 111 of the base material layer 110 between the adjacent network segments 121 within the interior regions 123. The nonstick coating layer 130 may extend outward of the base material layer 110 to an outer nonstick coating surface 132 adjacent to the planar outer mesh surface 122. Thus, the nonstick coating layer 130 may be interspersed among the network segments 121 to together with the mesh layer 120 provide an outer surface comprising a plurality of outer nonstick coating surface 132 regions disposed between outer mesh surface 122 regions. In various embodiments, the outer nonstick coating surface 132 may include discrete or interconnected regions. In the embodiment illustrated in FIG. 1B, the mesh layer 120 includes a plurality of interconnected network segments 121 positioned over a planar portion of the surface 111 of the base material layer 110 that are arranged to laterally surround interior regions 123 and, hence, discrete portions of the nonstick coating layer 130 disposed therein.

Interior regions 123 may preferably have a spacing dimension between network segments 121 or surface dimension such as diameter between about 0.8 mm and about 2 mm. Smaller dimensions or larger dimensions may also be used. The width of the network segments 121 between the interior regions 123 may preferably be between about 0.3 mm and about 0.5 mm, although smaller or larger width dimensions may also be used. The thickness of the network segments 121 may also preferably be between about 0.5 mm to about 1 mm normal to the cookware article surface 100; however, smaller or larger thicknesses may be used. In various embodiments, the base material layer 110 may preferably be between 3 mm and 4 mm thick, although smaller or larger thicknesses may be used.

It has been discovered that the ranges of dimensions of the interior regions 123 and the network segments 121 provide the benefits of easy food release even from the surface 123 which is not coated with non-stick material in regions 130. At the same time, the surface 123 also protects the non-stick surface 132 from damage by cutting and food preparation utensils, such as knives, spatulas, tongs and the like.

It has also been discovered that the corrugation pattern enhances food browning with a small quantity of cooking oil being used for this purpose.

The base material layer 120 may be coated with the nonstick coating layer 130 according to any suitable method. For example, various US patents teach compositions of matter and methods of applying organic based and nonstick coatings to cookware vessels. These include U.S. Pat. No. 3,986,993 to Vassiliou (issued Oct. 19, 1976); U.S. Pat. No. 4,118,537 to Vary, et al. (issued Oct. 3, 1978); U.S. Pat. No. 4,321,177 to Wilkinson (issued Mar. 23, 1982); U.S. Pat. No. 5,691,067 to Patel (issued Oct. 25, 1997) and U.S. Pat. No. 6,133,359 to Bate, et al. (issued Oct. 17, 2000), all of which are incorporated herein by reference. The nonstick coating layer 130 may typically contain one or more low surface energy polymers of resin, particularly fluorinated resins or fluorinated silicone resins, and silicone resins, including, PTFE (polytetrafluoroethylene), FEP (fluorinated ethylene propylene), PFA (Perfluoroalkoxy) and combinations thereof, along with reinforcing fillers such as glass, aluminum oxide titanium oxide, silicon carbide, and the like, and may preferably be deposited as multilayer coatings with varying compositions so the exposed outer surface, though softer, is more chemically inert and water and oil repellent. The nonstick coating layer 130 may also include one or more binder resins such as polyamide-imide (PAI), polyphenylene sulphide (PPS), polyether sulphone (PES), or a silicone and possibly also pigments.

In various embodiments, the mesh layer 120 may be embedded into the base material layer 110 by force. For example, surface 111 of the base material layer 110 may be coated with the nonstick coating layer 130 and the mesh layer 120 may be forced against the exposed nonstick coating layer 130. As the mesh layer 120 is embedded by force into the base material layer 110 it penetrates the nonstick coating layer 130 which is then exposed within the interior regions 123 between the network segments 121 of the mesh layer 120. The embedding process may result in the planar outer mesh surface 122 being disposed no lower than the outer nonstick coating surface 132 positioned within the interior regions 123 along the outer surface. In some embodiments, the outer mesh surface 122 is approximately level with the outer nonstick coating surface 132. In other embodiments, the outer mesh surface 122 extends beyond the outer nonstick coating surface 132, such as between 0 mm and about 0.01 mm, or between about 0.01 mm and about 0.1 mm.

The mesh layer 120 preferably comprises a metal material, including alloys thereof, harder than the organic nonstick coating material of the nonstick coating layer 130 and the base material of the base material layer 110. For example, a mesh layer 120 formed of stainless steel network segments 121 may be readily embedded into an aluminum base material after a nonstick coating layer 130, as stainless steel network segments 121 are harder than both the aluminum base material and the nonstick coating material. The planar outer mesh surface 122 extending beyond or level with the nonstick coating outer surface 132 provides a network of protective shields that prevent hard surfaces, such as sharp steel tool surfaces, from digging into the nonstick coating 130 within the interior regions 123.

Figure 2A:
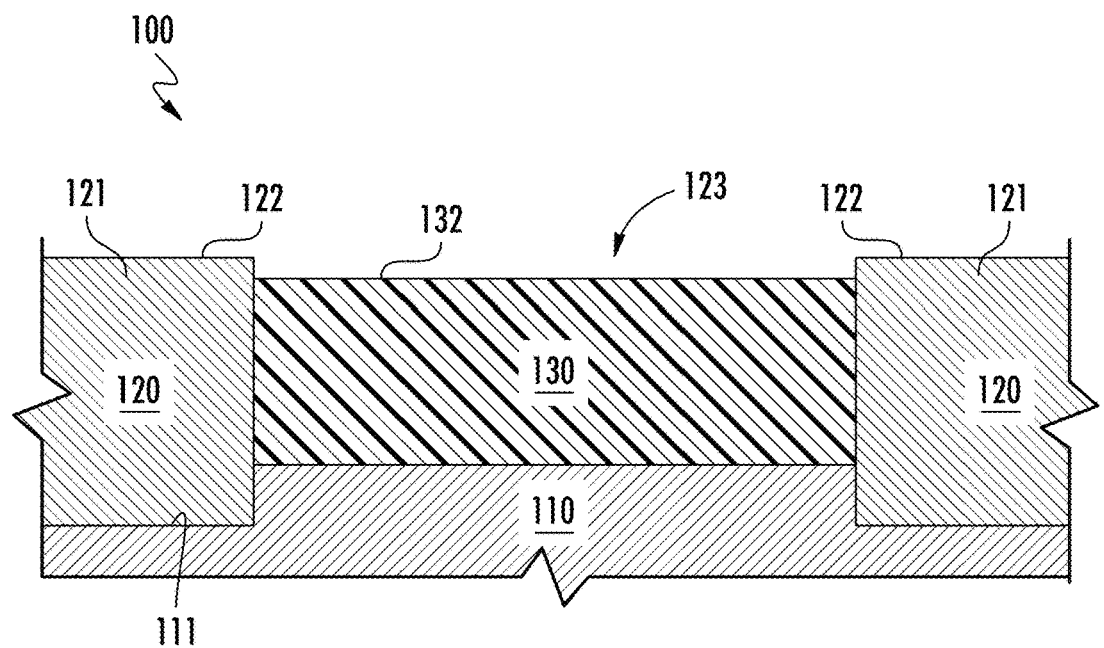
Figure 2B:
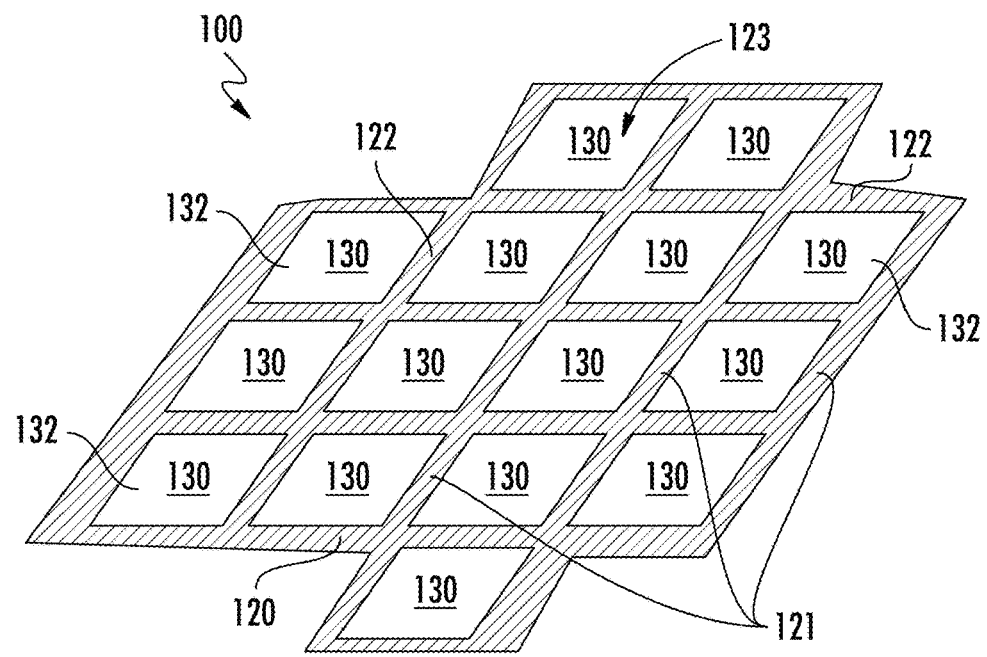
FIG. 2B is a top plan view thereof.

FIGS. 2A & 2B illustrate another embodiment of the cookware article surface 100 comprising a base material layer 110, mesh layer 120, and a nonstick coating layer 130. The layers 110, 120, 130 may be arranged in a manner similar to that described with respect to FIGS. 1A & 1B. As shown in FIG. 1A and FIG. 2A, network segments 121 of the mesh layer 120 may be arranged to define various shaped interior regions 123. For example, interior regions 123 may have hexagonal shapes, e.g., as shown in FIG. 1A, or rectangular, parallelogram, or rhombus shapes. Other shapes may include arcuate, geometric, nongeometric, regular, or irregular shapes. In one embodiment, networks segments 121 define rhomboid or diamond shaped interior regions 123, e.g., as shown in FIG. 2A. As introduced above, the interior regions 123 may be patterned along the cookware article surface 100 to include consistent or inconsistent sizes, shapes, and alignments. In one embodiment, network segments 121 define interior regions 123 of multiple shapes, sizes, or both.

The mesh layer 120 may be formed by casting, forming, assembly, material removal techniques such as excising material from sheets, or other suitable fabrication techniques to form the network segments 121. In one example, the arrangement of the network segments 121 of the mesh layer 120 illustrated in FIG. 2A may be formed by introducing rows of discrete slits in a metal sheet and then expanding the sheet such that each slit may then be opened to form connected network segments 121 wherein adjacent segments 121 define interior regions 123.

In various embodiments, a cookware article comprises the cookware article surface 100. The cookware article surface 100 may optionally be any portion of a pot, pan, tray, platter, platen, grill, or griddle surface, for example. In one embodiment, the cookware article surface 100 is a portion of a nonstick surface of a baking tray, or pizza pan wherein the mesh layer 120 protects the outer nonstick surface 132 from a knife blade, such as a mezzaluna, or circular pizza cutting wheel.

Figure 3:
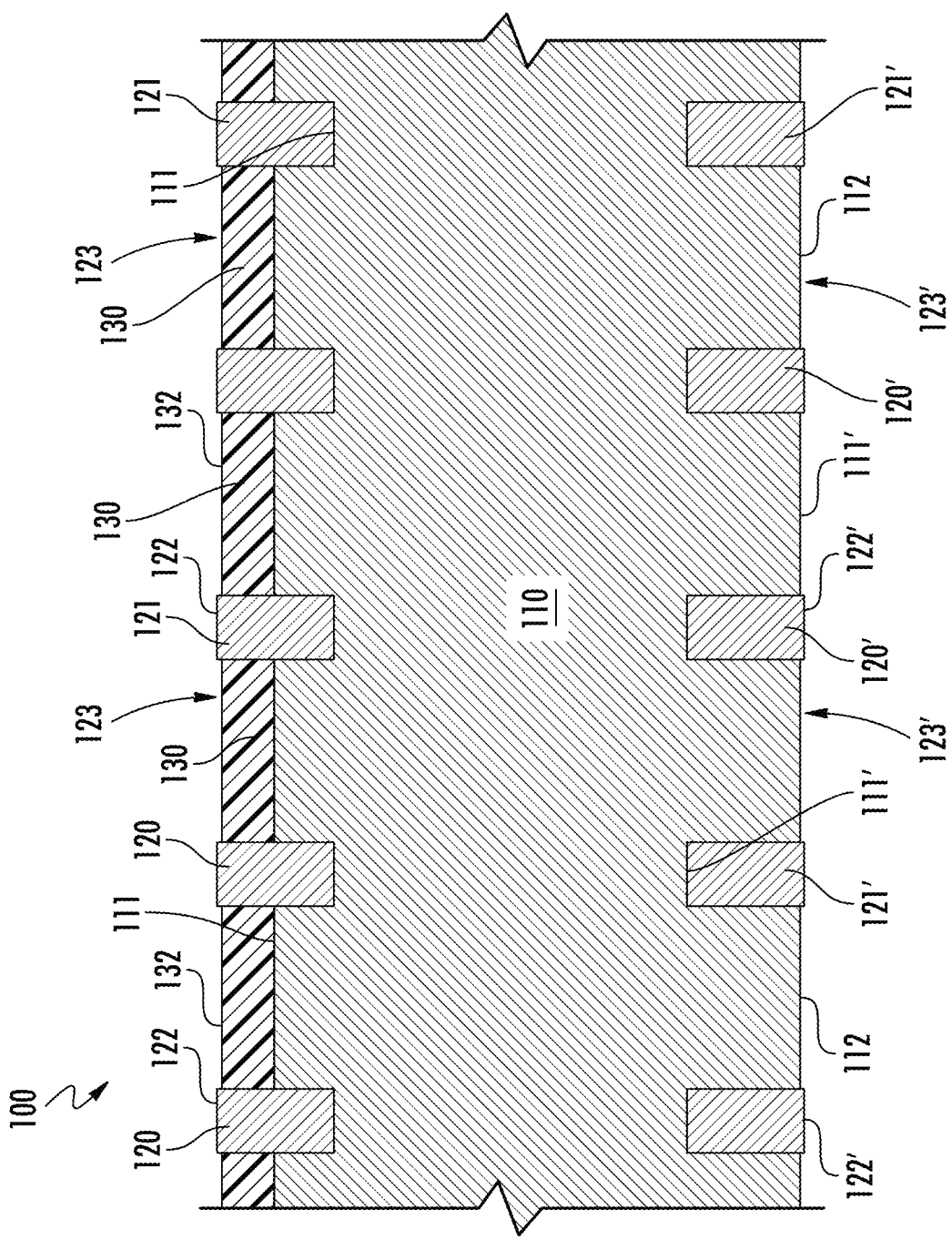
FIG. 3 is a schematic cross-sectional elevation view of a portion of a cookware article surface according to various embodiments described herein.

With reference to FIG. 3, in some embodiments, the cookware article surface 100 includes a base material layer 110 having multiple surfaces 111, 111' upon which mesh layers 120, 120' are disposed. In such embodiments, the base material layer 110 may be coated along at least one of the surfaces 111, 111' with a nonstick coating layer 130. Surfaces 111, 111' including the nonstick coating layer 130 will typically be surfaces 111, 111' that are intended to or in which it is foreseeable will contact food during use.

In the illustrated embodiment, the cookware article surface 100 comprises a base material layer 110, first and second mesh layers 120, 120', and a nonstick coating layer 130 wherein the first mesh layer 120 and the nonstick coating layer 130 are disposed on a first surface 111 of the base material layer 110 and the second mesh layer 120' is disposed on a second surface 111' of the base material layer 110, generally opposite the first surface 111. The first mesh layer 120 includes a plurality of first network segments 121 embedded in the first surface 111 and extending to a first outer mesh surface 122. The nonstick coating layer 130 is disposed within interior regions 123 defined by the first network segments 121 and extends outward from the first surface 111 to a plurality of outer nonstick coating surfaces 132 in an arrangement similar to that described with respect to FIGS. 1A-2B.

The second mesh layer 120' includes a plurality of second network segments 121' embedded in the second surface 111' and extending to a generally planar second outer mesh surface 122'. The second network segments 121' are arranged to define interior regions 123' between adjacent segments 121' within which the second surface 111' of the base material layer 110 is exposed to form an outer base material surface 112. In various embodiments, the base material layer 110 may preferably be between 3 mm and 4 mm thick, although smaller or larger thicknesses may be used. While the base material layer 110 is illustrated as the same across and through the thickness of the expanse of the cookware article surface 100, in various embodiments a same base material layer may not form both the first and second surfaces 111, 111'. For example, the base material layer 110 may comprise multiple base materials layers 110.

The second network segments 121' of the second mesh layer 120' are illustrated as being embedded deeper in the base material layer 110 than the first network segments 121 of the first mesh layer 120. In other embodiments the first network segments 121 may be embedded the same depth or deeper than the second network segments 121'. The second outer mesh surface 122' is disposed no lower than the outer base material surface 112. Thus, the second outer mesh surface 122' may extend outward beyond the outer base material surface 112 along the second surface 111'. The outer base material surface 112 may also be level with second outer mesh surface 122. The thickness of the second network segments 121' may be similar to the thickness of the first network segments. For example, in some embodiments, the thickness of the second network segments 121' may be between about 0.5 mm to about 1 mm normal to the cookware article surface 100; however, smaller or larger thicknesses may be used. For example, first or second network segments 121, 121' having larger thicknesses may be used to increase strength and durability.

The second network segments 121' may be interconnected to laterally surround interior regions 123' or may be partially or entirely disconnected to partially laterally surround interior regions 123'. Similarly, the outer base material surface 112 may be interconnected or comprise discrete regions. For example, the outer base material surface 112 may include a discrete surface region within each interior region 123' between interconnected second network segments 121'.

The second network segments 121' of the second mesh layer 120' are illustrated as having a width similar to the first network segments 121 of the first mesh layer 120. For example, the width of the second network segments 121' between the interior regions 123' may preferably be between about 0.3 mm and about 0.5 mm. In other embodiments, the first network segments 121 may have larger or smaller widths than the second network segments 121'. For example, the second network segments 121' may include thicknesses larger than 0.5 mm to increase induction capacity, when applicable, or the structural strength and durability therealong.

The second network segments 121' may define interior regions 123' having any shape, such as parallelogram, rhomboidal, hexagonal, arcuate, geometric, nongeometric, regular, or irregular shapes. The second network segments 121' may also defined interior regions having shapes, sizes, or in arrangements similar to or different than the shapes, sizes, or arrangements defined by the first network segments 121. In some embodiments, the second network segments are illustrated as defining interior regions 123' having similar diameters as the interior regions 123 defined by the first network segments 121. For example, the interior regions 123 may have a spacing dimension between network segments 121 or surface dimension such as diameter between about 0.8 mm and about 2 mm. However, in other embodiments, second network segments 121' define interior regions 123' having smaller or larger diameters than the interior regions 123 defined by the first network segments 121.

The outer base material surface 112 may correspond to the outer nonstick coating surface 132 in size, shape, or location. However, in other embodiments, outer base material surface 112 may not correspond to the outer nonstick coating surface 132 with respect to one or more of size, shapes, or location.

The second mesh layer 120' and second network segments 121' thereof may comprise materials and be fabricated in a manner similar to that described with respect to the first mesh layer 120. In various embodiments, the second network segments 121' may comprise a material harder than the base material along the second surface 111', such as a hard metal or alloy. In some embodiments, the second network segments 121' comprise stainless steel. In some embodiments, the second mesh layer 120' may be configured to provide induction heating features. For example, the second network segments 121' may comprise a ferromagnetic material. In one embodiment, the second mesh layer 120' comprises magnetic stainless steel for induction heating of the first outer surfaces 122/132.

Figure 4A:
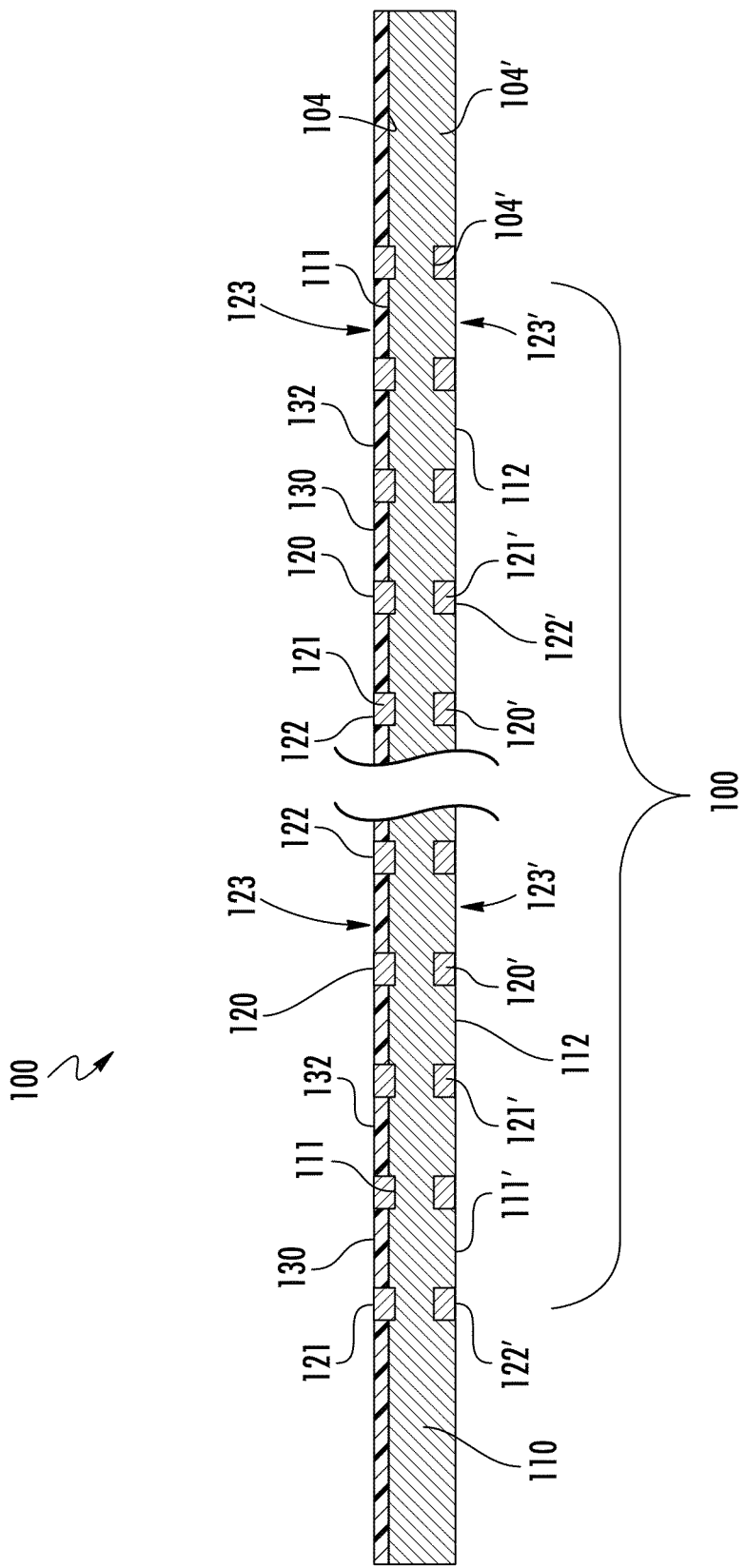
FIG. 4A is a cross-sectional elevation of a cookware article surface according to various embodiments described herein, where
Figure 4B:
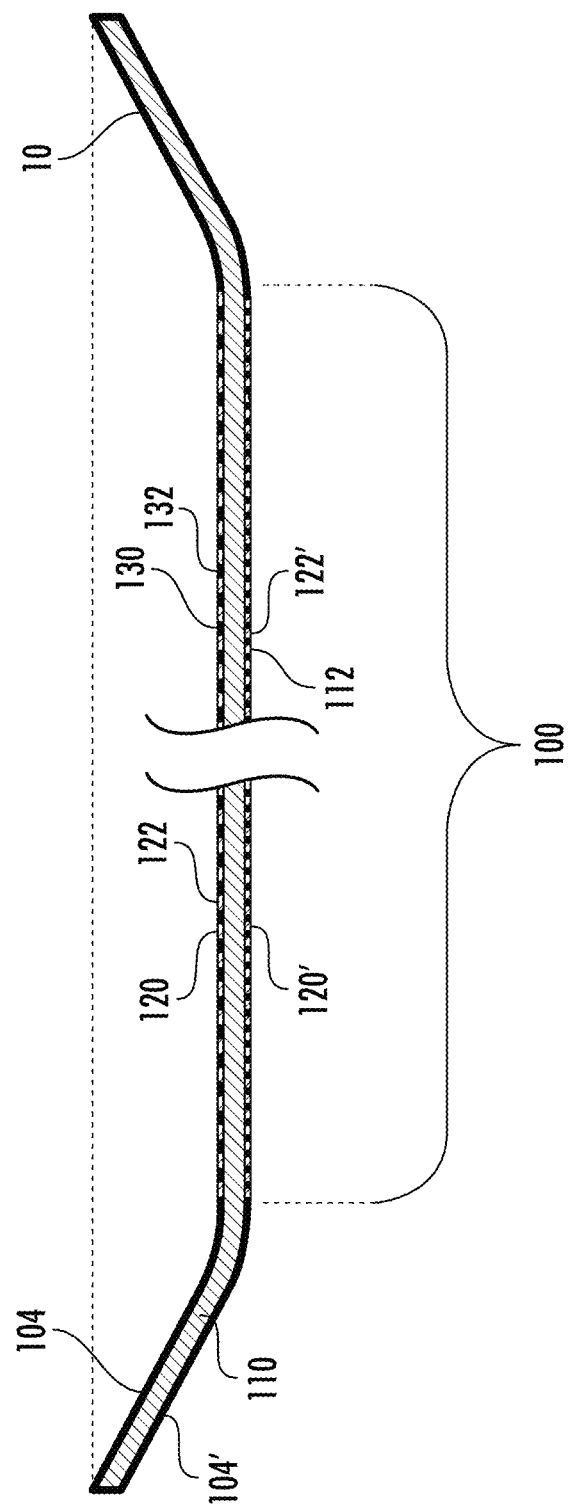
FIG. 4B is the cookware article surface of FIG. 4A formed into a cooking pan.

FIGS. 4A & 4B illustrate a cookware article surface 100 and the cookware article surface 100 employed in a cookware article 10 comprising a pan (FIG. 4B) according to various embodiments. The cookware article surface 100 may be similar to the cookware article surface 100 described with respect to FIG. 3. For example, the cookware article surface 100 comprises a base material layer 110, first and second mesh layers 120, 120', and a nonstick coating layer 130 wherein the first mesh layer 120 and the nonstick coating layer 130 are disposed on a first surface 111 of the base material layer 110 and the second mesh layer 120' is disposed on a second surface 111' of the base material layer, generally opposite the first surface 111. The first mesh layer 120 includes a plurality of first network segments 121 embedded in the first surface 111 and extending to a first outer mesh surface 122. The nonstick coating layer 130 is disposed within interior regions 123 defined by the first network segments 121 and extends outward from the first surface 111 to a plurality of outer nonstick coating surfaces 132 in an arrangement similar to that described with respect to FIGS. 1A-2B. The second mesh layer 120' includes a plurality of second network segments 121' embedded in the second surface 111' and extending to a generally planar second outer mesh surface 122'. The second network segments 121' are arranged to define interior regions 123' between adjacent segments 121' within which the second surface 111' of the base material layer 120 is exposed to form an outer base material surface 112.

The second network segments 121' disposed along the underside of the pan are preferably magnetic stainless steel for induction heating of the outer surfaces 122/132. The first and second network segments 121, 121' may define interior regions 123, 123' of any shape. In one embodiment, the first network segments 121, the second network segments 121', or both define hexagonal, parallelogram, rectangular, or rhomboidal shaped interior regions 123, 123' with a spacing dimension between network segments 121 or surface dimension such as diameter between about 0.8 mm and about 2 mm. The width of the network segments 121, 121' between the interior regions 123, 123' may preferably be between about 0.3 mm and about 0.5 mm. The thickness of the network segments 121, 121' may also preferably be between about 0.5 mm to about 1 mm normal to the cookware article surface 100. The base material layer may preferably be between 3 mm and 4 mm thick. The base material layer 110 along the second surface 111' may comprise similar base materials as described above with respect to FIGS. 1A-3. For example, the base material layer 110 along the second surface 111' may comprise aluminum.

The dish shape of the cookware article 10 may be formed before or after embedding the first mesh layer 120, second mesh layer 120, or both. For example, the network segments 121, 121' may be embedded when a pot or pan is formed. Side surfaces 104, 104' surround the planar cooking article surface 100. In various embodiments, interior or exterior side surfaces 104, 104' may also include a mesh layer 120, 120', nonstick layer 130, or both. For example, in the illustrated embodiment, the interior side surface 104 includes a nonstick layer. The cookware article 10 is preferably made by embedding network segments 121, 121' in a respective surface 111, 111' of the base material layer 110 after an organic nonstick material is coated onto the at least one surface 111, 111'. The network segments 121, 121' will first penetrate through the nonstick coating layer 130, but thereafter from a protective barrier from cutting tool, such as knives, mezzalunas, cutting wheels, spatulas and the like.

It will be appreciated that the embodiments illustrated in FIGS. 1A-2B may have a similarly configured opposite surfaces. For example, the embodiments illustrated in FIGS. 1A-2B may also include an opposite surface comprising base material with embedded mesh disposed between interior regions of base material similar to that described with respect to FIGS. 3-4B. In another example, the embodiments illustrated in FIGS. 1A-2B may include an opposite surface comprising a nonstick material layered over the base material layer and a mesh layer embedded in the base material and arranged in a manner similar to the base material layer 110, mesh layer 120, and nonstick layer 130 along the other surface. In any of the above or another embodiment, an outer mesh surface along the opposite surface may extend outward beyond an outer base surface or outer nonstick surface. In another embodiment, an outer base surface along the opposite surface may be level with or extend outwardly beyond the mesh surface portion. In yet another embodiment, the second surface 111' may have a protective layer or coating over the base material.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A method of making a surface of a cookware article, the method comprising:
   (a) providing a base material comprising a metal or metal alloy;
   (b) coating at least one planar surface of the metal or metal alloy with an organic nonstick material; and
   (c) compressing a first mesh comprising a plurality of first network segments comprising a metal or metal alloy onto the coated surface to embed the first network segments into the base material, wherein the first network segments define a plurality of interior regions between adjacent first network segments, wherein the first network segments extend outward of the base material beyond the nonstick material, and wherein the first network segments penetrate through the nonstick material.

2. The method of claim 1, wherein the method further comprises:
   (d) compressing a second mesh comprising a plurality of second network segments comprising a metal or metal alloy onto another surface of the base material located on an opposite side thereof, wherein the second network segments define a plurality of interior regions between adjacent second network segments, and wherein the second network segments extend outward of the base material at least as far as outer surfaces of the base material layer within the interior regions defined between the second network segments.

3. The method of claim 2, wherein the second network segments are embedded deeper in the base material layer than the first network segments.

* * * * *